United States Patent [19]

Graf

[11] 3,993,893

[45] Nov. 23, 1976

[54] DATA READER

[75] Inventor: Manfred Graf, Aldingen, Germany

[73] Assignee: J. Hengstler K.G., Aldingen, Germany

[22] Filed: Mar. 26, 1975

[21] Appl. No.: 562,177

[30] Foreign Application Priority Data

Mar. 30, 1974 Germany ........................ 2415613

[52] U.S. Cl. ........................ 235/61.11 E; 250/569; 340/149 A

[51] Int. Cl.[2] ........................ G06K 7/14; G06K 19/06

[58] Field of Search ............ 235/61.11 R, 61.11 D, 235/61.11 E, 61.12 R, 61.7 R, 61.7 B, 61.6 J, 61.6 E; 340/149 A; 179/90; 250/569; 35/48 B

[56] References Cited

UNITED STATES PATENTS

| | | | |
|---|---|---|---|
| 2,831,634 | 4/1958 | Luhn | 235/61.11 E |
| 3,121,159 | 2/1964 | Rogal | 235/61.6 J |
| 3,465,130 | 9/1969 | Beltz | 235/61.11 E |
| 3,474,230 | 10/1969 | McMillen | 235/61.7 R |
| 3,480,762 | 11/1969 | Del Vecchio | 235/61.11 E |
| 3,592,972 | 7/1971 | Lane | 179/90 |
| 3,858,032 | 12/1974 | Scantlin | 235/61.12 R |

*Primary Examiner*—Daryl W. Cook
*Assistant Examiner*—Robert M. Kilgore

[57] ABSTRACT

Apparatus is provided for reading information represented by at least one data line on a data carrier. Means are provided which define a path along which said data carrier is movable in a forward direction transversely to said data line. Line-reading means are adapted to detect said information when said data line is in a predetermined positon relative to said line-reading means. Position-detecting means are arranged to deliver a position-indicating signal when said data line is in said predetermined position. Data-receiving means are adapted to receive said information. Data-transmitting means serve to transmit the information detected by said line-reading means to said data-receiving means in response to said position-indicating signal.

9 Claims, 5 Drawing Figures

DATA READER

This invention relates to apparatus for electronically scanning data carriers, particularly identity cards (card reader).

Known apparatus for electronically scanning and reading data carriers comprise a light barrier for each bit position on the data carrier. These light barriers are statically scanned when such apparatus has been activated by an end switch. For reading a plurality of lines, these apparatus require a large number of such light barriers and these must be accommodated in a very small space. For this reason, such apparatus are highly expensive and the presence of a large number of elements within very small space gives rise to problems of heat dissipation. This arrangement has also a low dependability (MTBF—mean time between failure), and a failure of an individual light barrier cannot readily be detected. Other known arrangements provide for a reading of the information line by line. In these arrangements, the correct scanning position is ensured in that the data carrier is moved by a motor drive through the reader at uniform speed. Small tolerances can be obtained in such readers only with a high expenditure.

It is an object of the invention to provide apparatus which requires only a minimum of photoelectric devices and which is arranged for serial scanning and does not require a motor drive and mechanically movable elements, which would involve a considerable structural expenditure. It is also an object of the invention to provide for a reading of the data and for a storage of the data at addressable positions in a memory, which can be interrogated at computer speed when all information has been read. Besides, the apparatus should be compact and permit of a variation in its three-dimensional configuration.

To accomplish these objects, the apparatus provided by the invention for electronically scanning data carriers, particularly identity cards (card reader), is characterized by electronic line-reading means (photoelectric hole detector) for reading an inserted data carrier (punched card) line by line and for transmitting the data represented by each line to electronic memories and/or computers. The data (holes) are arranged line by line, and position-detecting elements are provided, which are spaced apart the same distance as the lines (of holes) in a direction which is at an angle (at right angles) to the lines (of holes). The data carriers are photoelectrically scanned under electronic control to detect a code on the punched card.

An embodiment of apparatus according to the invention is shown by way of example in the drawings and will be described hereinafter.

Figure 1:
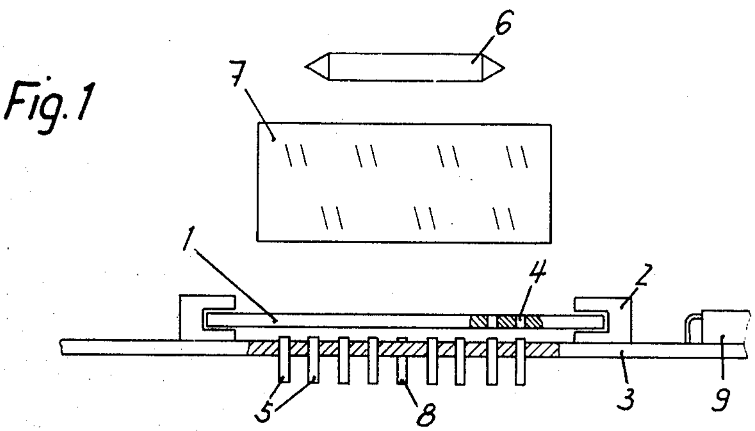
FIGS. 1 and 2 are a front elevation and top plan view, respectively, and show diagrammatically a photo-electric card reader.
Figure 2:
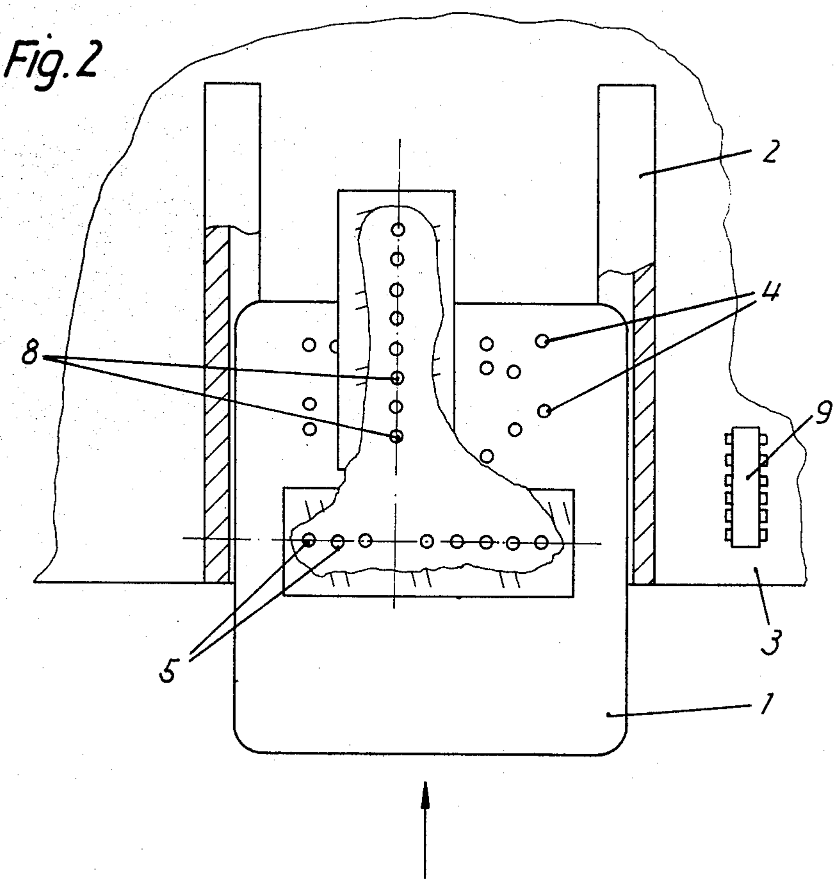

The photoelectric card reader shown in FIGS. 1 and 2 comprises a printed circuit board 3, on which a card guide 2 is provided, which is adapted to receive a punched card 1, particularly an identity card. The punched cards 1 carry information in the form of a plurality of columns and rows or lines of holes 4.

Light from a lamp 6 is transmitted through line-focussing means 7 onto line-reading phototransistors 5 arranged in a row. Position-detecting phototransistors 8 are arranged in a column which extends at right angles to the row of line-reading phototransistors 5 and receive light which has been emitted from an additional lamp and transmitted through line-focussing means similar to the means 6 and 7. The phototransistors 8 are spaced apart the same distance as the rows or lines of holes of card 1. As the card 1 is inserted into the guide 2, the phototransistors 5 and 8 and the electronic means 9 cooperate to read line by line the data which are represented by the holes 4 arranged in lines in the punched card 1.

Figure 3:
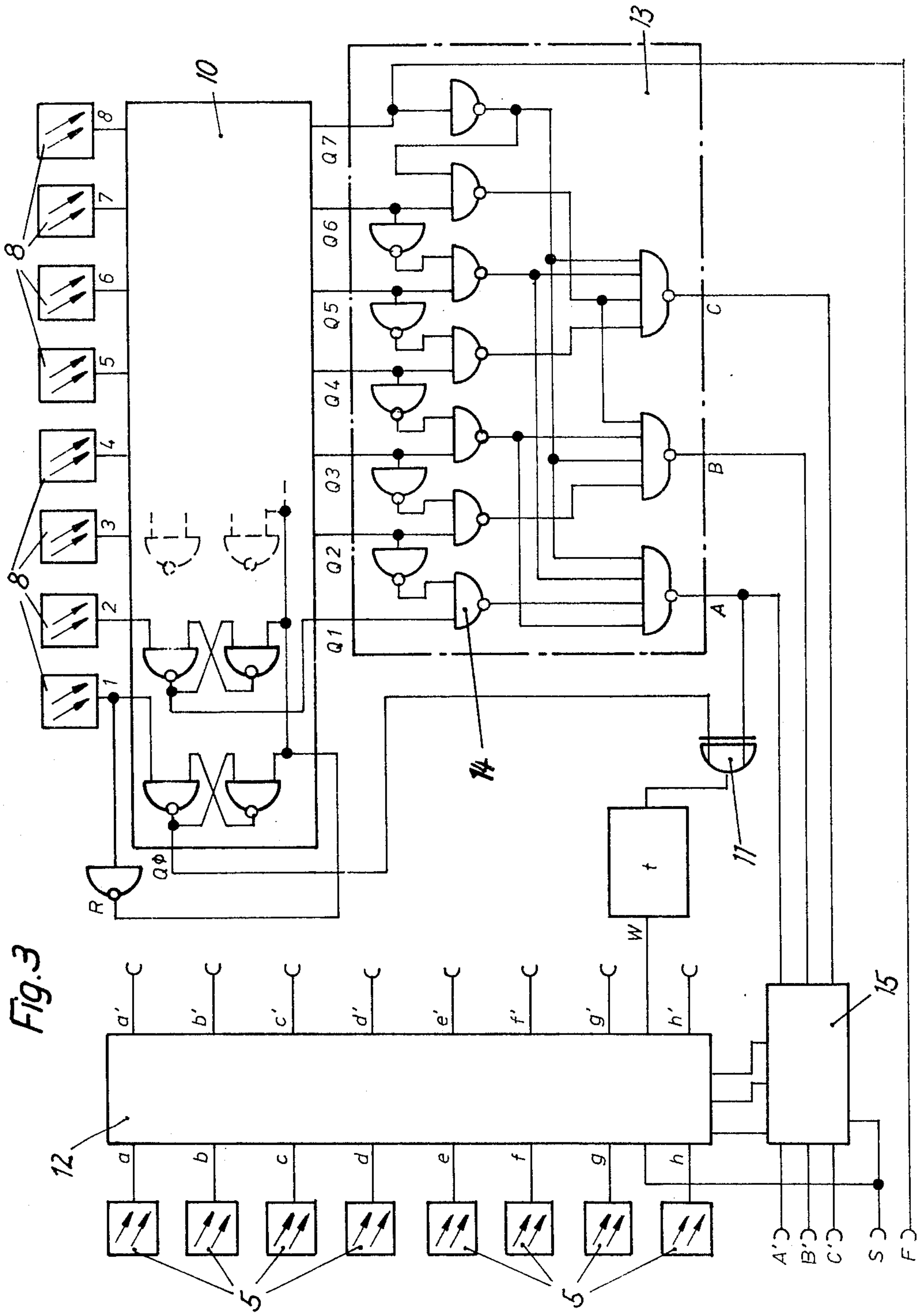
FIGS. 3 and 4 are two circuit diagrams of photoelectric card readers as shown in FIGS. 1 and 2.

With reference to the circuit diagrams in FIGS. 3 and 4 and the waveform diagram of FIG. 5, the circuit arrangement and the mode of operation will now be described. It is apparent that the present apparatus is adapted to read eight lines or rows of eight bit positions each. The number of phototransistors 5 in a row is equal to the number of bits of the code which is to be read. The number of position-detecting phototransistors 8 is equal to the number of lines or rows to be read.

When a punched card 1 is inserted into the card guide 2 and intercepts the light barrier associated with the first position-detecting phototransistor 8, the markers consisting of RS flip-flops 10 which are associated with the position-indicating phototransistors 8 are primed (common reset input changed to logical 1). At the same time, the first marker Q $\phi$ is set, which by an exclusive-OR element 11 controls a one-shot *t*, which delivers to the address $\phi$ of an electronic write-read memory (RAM) 12 a short write pulse W of about 100 ns, which represents the information (*a . . . h*) which is detected at that time by the line-reading photoelectric transistors 5. The one-shot *t* consists of a monostable flip-flop circuit which is triggered on and off. When the leading edge of the punched card reaches the second position-detecting phototransistor 8, a second marker Q 1 is set, which causes an address encoder 13 to deliver a position signal 1. As the output A changes from one logical state to the other, the exclusive-OR gate 11 starts the one-shot *t* so that the information which is then detected by the line-reading phototransistors 5 is written into the read- and write-memory 12 at address 1. When the third position is reached, another marker is set, which by means of the NAND-element 14 blocks the output signal of the preceding marker Q 2 so that the address encoder 13 connects only to output B and the information represented by the third line can be written into the memory 12 at address 2. These line-reading cycles are repeated until the information represented by the last line has been stored at the last address. When the last marker Q 7 is set, an end-of-record signal F is delivered, which indicates that the data *a'* . . . *h'* which have been stored in memory 12 can be read when the corresponding interrogating addressing lines (A', B', C') have been connected to the memory 12 by the address multiplexer 15. The latter is changed to the interrogating addressing lines (A', B', C') in response to the application of a selecting signal S.

The address encoder 13 consists of a conventional code converter for converting a one-of-*n* code into a binary code and operates in accordance with the following truth table (see also FIG. 4):

| Decimal value | Positions 1 2 3 4 5 6 7 8 | Address A B C |
|---|---|---|
| 0 | 0 0 0 0 0 0 0 0 | 0 0 0 |
| 1 | 1 0 0 0 0 0 0 0 | 1 0 0 |
| 2 | 1 1 0 0 0 0 0 0 | 0 1 0 |
| 3 | 1 1 1 0 0 0 0 0 | 1 1 0 |
| 4 | 1 1 1 1 0 0 0 0 | 0 0 1 |
| 5 | 1 1 1 1 1 0 0 0 | 1 0 1 |
| 6 | 1 1 1 1 1 1 0 0 | 0 1 1 |
| 7 | 1 1 1 1 1 1 1 0 | 1 1 1 |

As the card 1 is retracted beyond the first position, the markers 10 are reset. When another card 1 is inserted, the memory 12 is overwritten and another end-of-record signal F is delivered when the last position (Q7) has been reached.

Whenever the card has reached a line-reading position, a single relatively short spike pulse W is delivered to prevent a reading error which when the card 1 is vacillated as it is inserted into the reader could occur because the phototransistors 5 do not properly detect the information to be written into the memory 5. The write pulse W has a width of about 100 ns, which ensures that there will be no reading error even when the punched card 1 is inserted very fast. A movement of the punched card 1 opposite to the direction of insertion will not result in a reading error because the set markers 10 prevent an access to and overwriting at the previously selected addresses.

Figure 4:
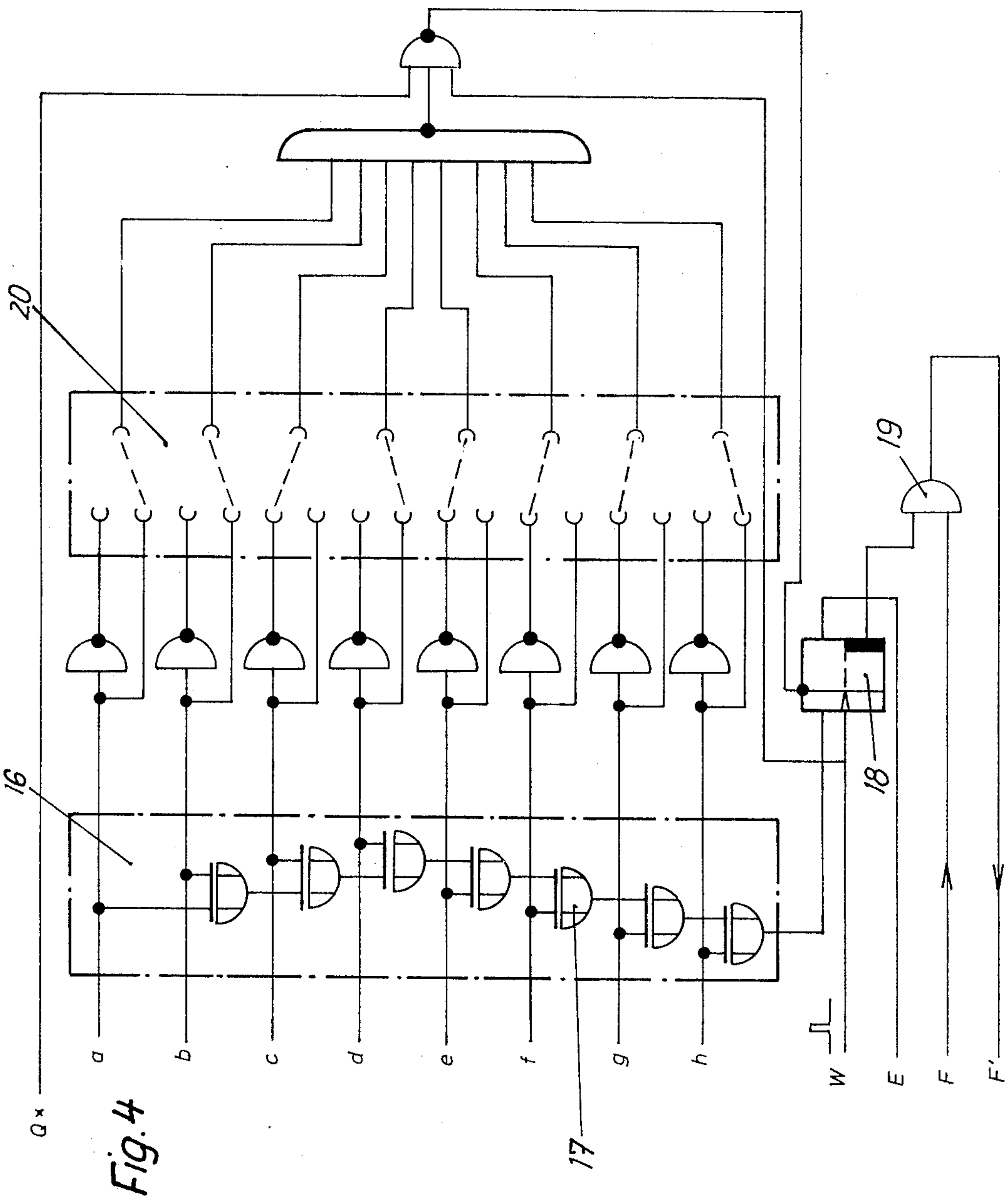
Figure 5:
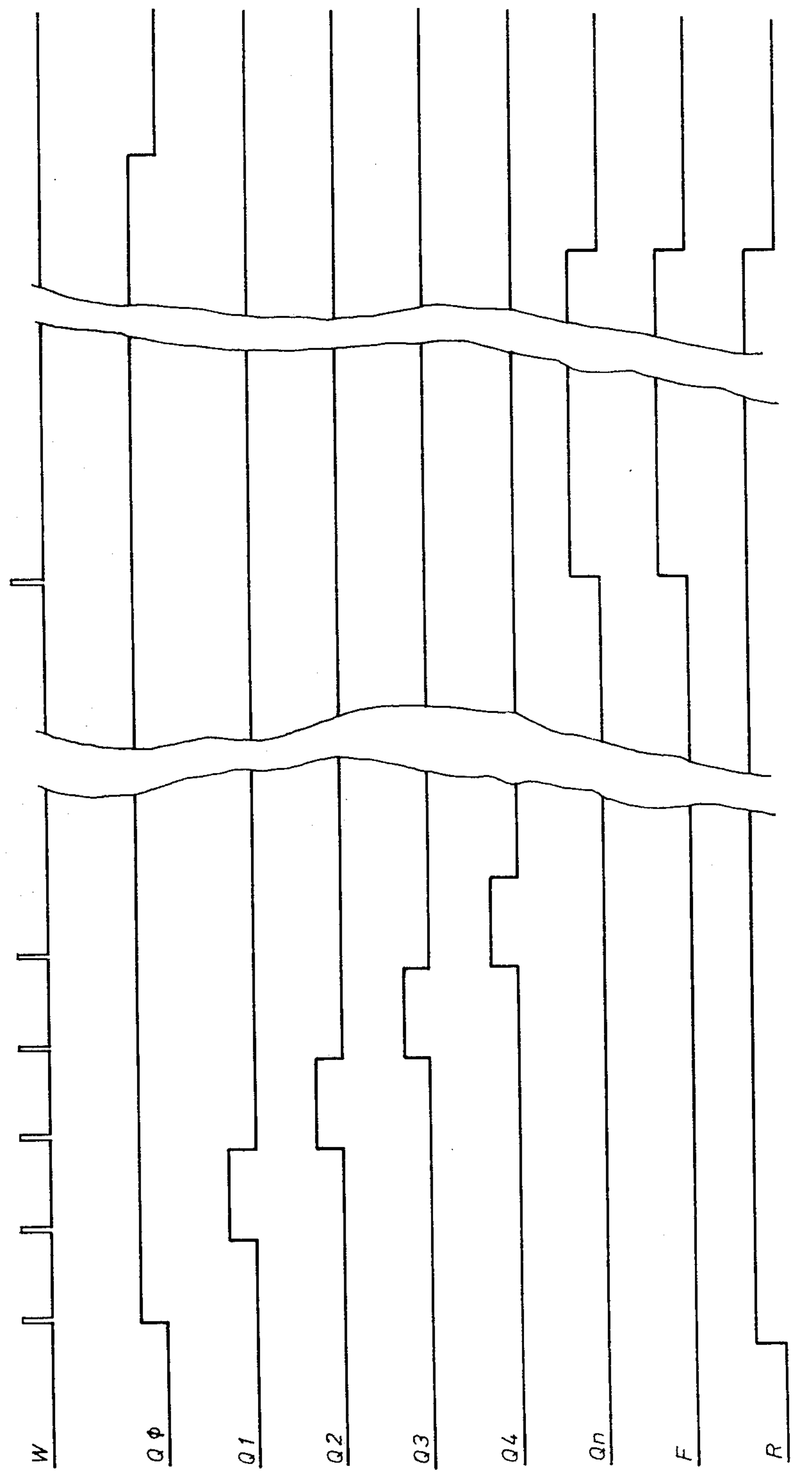
FIG. 5 shows waveforms which are generated in such card reader.

FIG. 4 shows that an optional additional circuit may be used for a line parity check and for a check of the proper coordination of the punched identity card with the reader. When one of these checks gives an unsatisfactory result, the end-of-record signal will be inhibited and a malfunction signal will be delivered.

The parity check is performed by means of a comparator circuit 16, which comprises seven exclusive-OR elements 17, which checks the line information (*a* . . . *h*), e.g., for an even number of logical levels and in case of a parity error sets a flip-flop 18 when the one-shot *t* delivers the write pulse W. The set flip-flop causes an AND-element 19 to inhibit the end-of-record signal F and delivers a malfunction signal E.

The punched-card coordination check is programmed by an encoding plug connector, encoding matrix or encoding switch 20. In the example shown in FIG. 4, an entire line, which may represent $2^7 = 128$ different codes, is subjected to a validity check. If the information (*a* . . . *h*) represented by the line of the data carrier 1 disagree from the information for which the apparatus is programmed, the flip-flop 18 is also set at the time of the line signal Qx and the write pulse W so that the end-of-record signal F is inhibited and a malfunction signal E is delivered.

What is claimed is:

1. Apparatus for reading information from a data carrier containing a plurality of equally spaced parallel data lines, comprising means defining a path along which the data carrier is movable in a forward direction transversely to the data lines, line reading means disposed parallel to the data lines on a data carrier for detecting the information carried by a data line when it is in a predetermined position, one position-detecting element associated with each data line of a data carrier for initiating a position-indicating signal when the associated data line is in a predetermined position, each said position-detecting element being disposed in a column parallel to said path of movement of said data carrier and being spaced apart by a distance corresponding to the spacing between the data lines on a data carrier, a plurality of data receiving addresses, each of which is associated with a respective position-detecting element for receiving information represented by one of the data lines of a data carrier, and an address encoder means for transmitting information read by said line reading means to one of said data receiving addresses in response to a position-indicating signal delivered from the respective one of said position-detecting elements.

2. Apparatus as claimed in claim 1 wherein said address encoder means comprises a one shot timer responsive to said position-indicating signal to cause said address encoder means to transmit during a predetermined interval of time, the information then read by said line reading means to the data receiving address associated with the position-detecting element which has delivered said position-indicating signal.

3. Apparatus as claimed in claim 2 wherein said predetermined interval of time is of the order of nanoseconds.

4. Apparatus as claimed in claim 1 wherein said position-detecting elements comprise first and second position-detecting elements and at least one succeeding position-detecting element for delivering respective first, second and succeeding position-indicating signals as said data carrier is moved in said forward direction along said path.

said address encoder means comprising first, second and succeeding flip-flop markers associated with respective first, second and succeeding position-detecting elements for causing said address encoder means to transmit information then read by said line reading means to a respective receiving address and to overwrite any information previously stored at said address, means whereby each of said succeeding markers is responsive to the position-indicating signal from the associated position-detecting element to disable each preceding one of said second and succeeding markers, and means associated with said address encoder means for disabling each of said second and succeeding markers and allowing said address encoder means to receive another first position-indicating signal delivered in response to a forward movement of a data carrier along said path.

5. Apparatus as claimed in claim 4 wherein said first flip-flop marker assumes first or second states in response to alternate first position-indicating signals, said first flip-flop marker in said first state causing said address encoder means to transmit the information then read by said line reading means to a respective one of said addresses associated with the first position-detecting element, and in said second state causing disabling of each of said second and succeeding markers.

6. Apparatus as claimed in claim 4 wherein said position-detecting elements comprise a last position-detecting element for delivering a position-indicating signal when said data carrier has moved in said forward direction along said path to a final position, said apparatus further comprising a signal generator for generating an end-of-record signal in response to the position-indicating signal from said last position-detecting element.

7. Apparatus as claimed in claim 6 comprising programmed checking means for inhibiting said end-of-record signal when information represented in each of said data lines in a predetermined position is not encoded in a predetermined code.

8. Apparatus as claimed in claim 7 wherein said programmed checking means comprises an encoding plug connector.

9. Apparatus as claimed in claim 1 wherein said data carriers are in the form of cards, said means defining a path comprise a guide for said cards, said line reading means comprise photoelectric devices, and said data receiving means comprise an electronic computer.

* * * * *